United States Patent
Strafford et al.

(10) Patent No.: US 10,852,505 B2
(45) Date of Patent: Dec. 1, 2020

(54) ISOTHERMALIZED MIRROR ASSEMBLY

(71) Applicant: Soter Technology, LLC, Ashburn, VA (US)

(72) Inventors: David Strafford, Leesburg, VA (US); Diana Strafford, Leesburg, VA (US)

(73) Assignee: SOTER TECHNOLOGY, LLC, Ashburn, VA (US)

( * ) Notice: Subject to any disclaimer, the term of this patent is extended or adjusted under 35 U.S.C. 154(b) by 19 days.

(21) Appl. No.: 16/376,939

(22) Filed: Apr. 5, 2019

(65) Prior Publication Data

US 2020/0319426 A1    Oct. 8, 2020

(51) Int. Cl.
| | |
|---|---|
| *G02B 7/18* | (2006.01) |
| *F28D 15/04* | (2006.01) |
| *F28D 15/02* | (2006.01) |
| *G02B 5/08* | (2006.01) |

(52) U.S. Cl.
CPC ......... *G02B 7/181* (2013.01); *F28D 15/0233* (2013.01); *F28D 15/04* (2013.01); *G02B 5/08* (2013.01)

(58) Field of Classification Search
CPC .......... G02B 7/181; G02B 5/08; G02B 7/182; F28D 15/0233; F28D 15/04
See application file for complete search history.

(56) References Cited

U.S. PATENT DOCUMENTS

| | | | | |
|---|---|---|---|---|
| 4,686,961 | A * | 8/1987 | Garrison | F24S 60/10 126/635 |
| 8,936,954 | B2 * | 1/2015 | Paschkewitz | F21V 29/505 438/26 |
| 9,029,684 | B2 * | 5/2015 | Lin | F28D 15/04 136/248 |
| 9,995,507 | B2 * | 6/2018 | Norman | H01L 31/0547 |
| 2008/0257335 | A1 * | 10/2008 | Lowstuter | F24S 23/74 126/605 |
| 2014/0193929 | A1 * | 7/2014 | Paschkewitz | F21V 7/10 438/26 |
| 2016/0305714 | A1 * | 10/2016 | Smith | B64G 1/506 |
| 2018/0087807 | A1 * | 3/2018 | Boyle | H02S 40/44 |

* cited by examiner

Primary Examiner — Jon T. Schermerhorn, Jr.

(57) ABSTRACT

An isothermalized mirror assembly is a mirror structure that uses a heat pipe to isothermalize heat loads. The isothermalized mirror assembly includes at least one mirror unit and a quantity of thermally-convective fluid. The mirror unit includes a vacuum enclosure, a capillary medium, at least one reflector, and a plurality of cross supports. The vacuum enclosure is the structural base of the isothermalized mirror assembly and is used to retain a vacuum and the thermally-convective fluid. The cross supports are mounted within the vacuum enclosure and increases the structural integrity of the vacuum enclosure. The capillary medium is mounted across the interior of the vacuum enclosure and about each cross support. The capillary medium and the thermally-convective fluid work in conjunction to form a heat pipe within the vacuum enclosure. The reflector is externally mounted to the vacuum enclosure in order to redirect EM radiation.

15 Claims, 7 Drawing Sheets

ISOTHERMALIZED MIRROR ASSEMBLY

FIELD OF THE INVENTION

The present invention generally relates to isothermalizing a mirror assembly with an integrated heat pipe. More specifically, the present invention uses the integrated heat pipe to prevent thermal deformations in the mirror assembly.

BACKGROUND OF THE INVENTION

Traditionally, a thermally stable mirror is made of a material with a very-low coefficient of thermal expansion (CTE) (e.g. ultra-low expanding glass) or is made of a material with a very-high intrinsic thermal conductivity (e.g. silicon carbide, silicon/silicon carbide, and carbon-silicon carbide). In addition, heat pipes are known to remove heat in other applications (e.g. removing heat from a central processing unit in a computer, removing heat from electronics in a satellite, and removing heat from an incandescent light bulb in a flashlight), but heat pipes are not known to stabilize the shape of a structure in the presence of heat loads.

Therefore, the present invention integrates a heat pipe or vapor chambers into a mirror structure in order to isothermalize the mirror structure. Consequently, the present invention minimizes deformations in the mirror structure during the presence of heat loads. The present invention allows for the construction of lightweight, thermally stable mirror structures, which are able to isothermalize the thermal gradients felt by their physical structure. The present invention can be configured for a mirror structure with high stability at low thermal loads, such as the outer barrel assembly of a thermally well-stabilized satellite. The present invention can also be configured for a mirror structure with stability under very high thermal loads, such as direct solar-viewing mirrors or mirrors using internal supports.

DETAILED DESCRIPTION OF THE INVENTION

Figure 1:
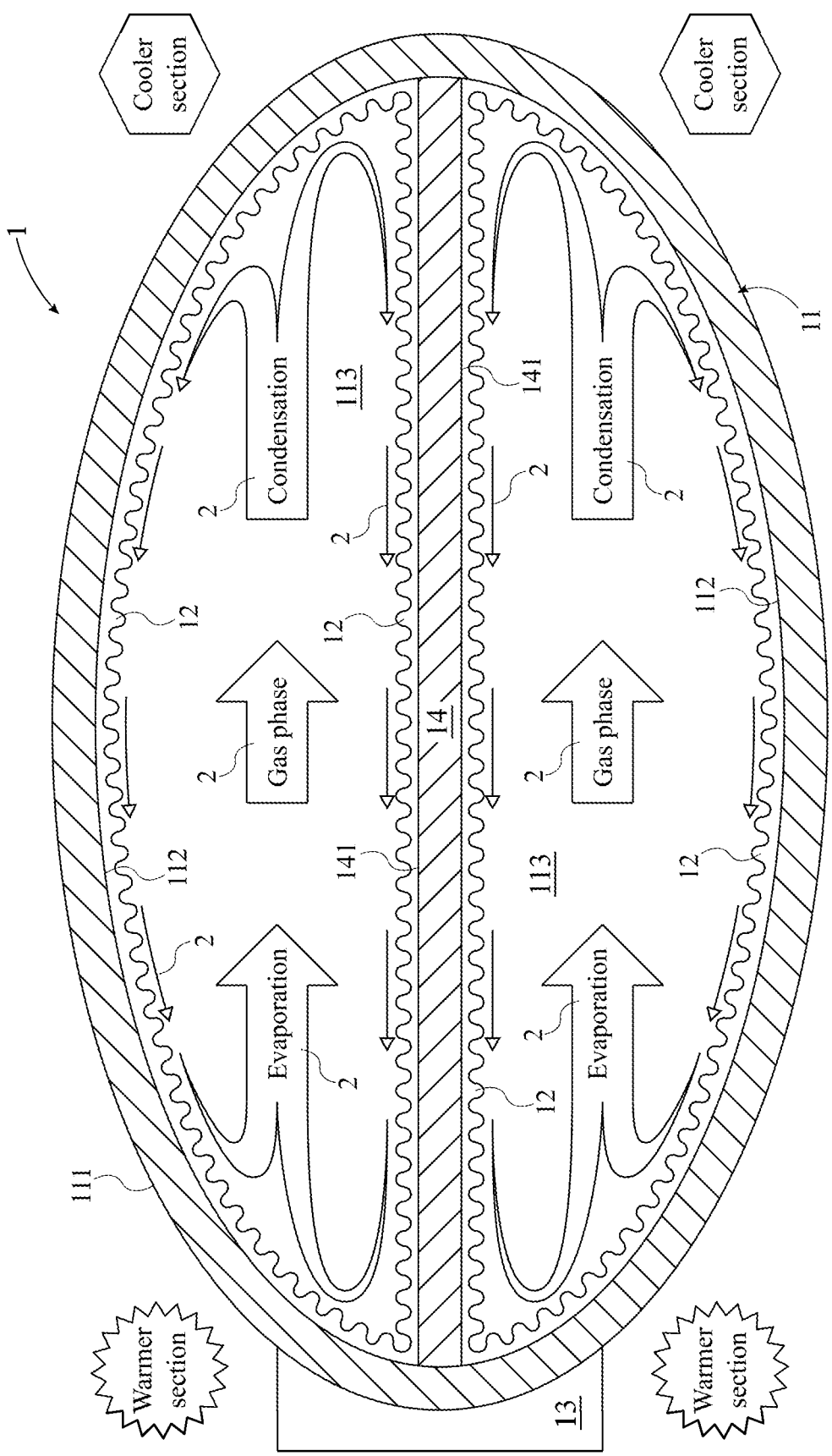
FIG. 1 is a schematic diagram of the present invention as a heat pipe.

All illustrations of the drawings are for the purpose of describing selected versions of the present invention and are not intended to limit the scope of the present invention.

The present invention is an isothermalized mirror assembly, which uses a heat pipe or vapor chambers to minimize thermal deformations in the presence of localized heat loads (e.g. solar heat loads on a telescope in a satellite). The present invention also prevents other kinds of deformations, such as "quilting", which can result from polishing pressures, atmospheric pressure, changes in the internal vapor pressure, etc. The present invention allows for the construction of lightweight mirror structures that are able to thermally stabilize because the naturally-occurring thermal gradients in those mirror structures are used to isothermalize those mirror structures. Some examples mirror structures that can be thermally stabilized by the present invention include, but are not limited to, those for a spacecraft, those for a ground-based telescope, and those for an airborne telescope. As can be seen in FIGS. 1 through 4, a preferred embodiment of the present invention comprises at least one mirror unit 1 and a quantity of thermally-convective fluid 2. The at least one mirror unit 1 is one or more distinct units of the present invention that is able to reflect electromagnetic (EM) radiation. The quantity of thermally-convective fluid 2 is used to transfer heat from a warmer section of the at least one mirror unit 1 to a cooler section of the at least one mirror unit 1. The quantity of thermally-convective fluid 2 can be, but is not limited to, water above 0 degrees Celsius (° C.), ammonia or a water/ammonia mixture below 0° C., fluids selected for cryogenic applications (e.g. helium, neon, and oxygen), and fluids selected for higher temperatures (e.g. naphthalene and different kinds of liquid metals such as cesium, potassium, or sodium).

In addition, each of the at least one mirror unit 1 comprises a vacuum enclosure 11, a capillary medium 12, at least one reflector 13, and a plurality of cross supports 14. The vacuum enclosure 11 is a sealed container that retains a vacuum so that heat can be more efficiently transferred through the present invention by the quantity of thermally-convective fluid 2. The vacuum enclosure 11 is also used as a structural base for the other components of the present invention. In addition, the vacuum enclosure 11 comprises an exterior surface 111 and an interior surface 112, which are references components for the vacuum enclosure 11. Consequently, an interior volume 113 is delineated by the interior surface 112 and is the hollow internal space of the vacuum enclosure 11. The capillary medium 12 is used to induce movement of the quantity of thermally-convective fluid 2 through the vacuum enclosure 11. The at least one reflector 13 is one or more functional components that enable the at least one mirror unit 1 to reflect EM radiation. The plurality of cross supports 14 is used to internally improve the structural integrity of the vacuum enclosure 11.

The general configuration of the aforementioned components allows the present invention to effective and efficiently isothermalize mirror structures. The plurality of cross supports 14 is mounted within the vacuum enclosure 11, which allows the vacuum enclosure 11 to internally maintain its structural integrity without having a bulky external support system. The plurality of cross supports 14 is also distributed throughout the interior volume 113, which allows different sections of the vacuum enclosure 11 to be evenly supported by the plurality of cross supports 14. The plurality of cross supports 14 is preferably used to stabilize and reinforce the positioning of the at least one reflector 13. The quantity of thermally-convective fluid 2 is retained within the interior volume 113 in order to confine the movement of the quantity of thermally-convective fluid 2 within the vacuum enclosure 11. The capillary medium 12 is mounted across the interior surface 112 and a lateral surface 141 for each of the plurality of cross supports 14 so that the capillary medium 12 can provide the quantity of thermally-convective fluid 2 with pathways to travel across the interior surface 112 and/or the lateral surface 141 of any of the plurality of cross supports 14. In some embodiments of the present invention (e.g. in FIG. 2), the plurality of cross supports 14 also have a plurality of vent holes 142 traversing through the lateral surface 141 so that the plurality of vent holes 142 is able to provide more surface area from the capillary medium 12 to span across. The at least one reflector 13 is mounted onto the exterior surface 111, which allows the at least one reflector 13 to be in an optimal position to reflect EM radiation off the present invention.

As can be seen in FIG. 1, the general configuration of the aforementioned components also allows the interior volume 113 to be configured as a heat pipe, wherein the quantity of thermally-convective fluid 2 is able to convert between a gas phase and a liquid phase as the quantity of thermally-convective fluid 2 travels through the capillary medium 12. Thus, the present invention follows a heat-pipe cycle between the warmer section of the at least one mirror unit 1 and the cooler section of the at least one mirror unit 1. The heat-pipe cycle begins by evaporating an arbitrary portion of the quantity of thermally-convective fluid 2 into its gas phase because the arbitrary portion is proximal to the warmer section and absorbs thermal energy from the warmer section. The heat-pipe cycle continues by migrating the arbitrary portion in its gas phase from the warmer section, through the interior volume 113, and to the cooler section so that the thermal energy is transferred from the warmer section to the cooler section. The heat-pipe cycle continues by condensing the arbitrary portion into its liquid phase because the arbitrary portion is proximal to the cooler section and dissipates the thermal energy at the cooler section. The heat-pipe cycle concludes by wicking the arbitrary portion in its liquid phase from the cooler section, through the capillary medium 12, and to the warmer section so that the arbitrary portion can repeat the heat-pipe cycle.

Figure 2:
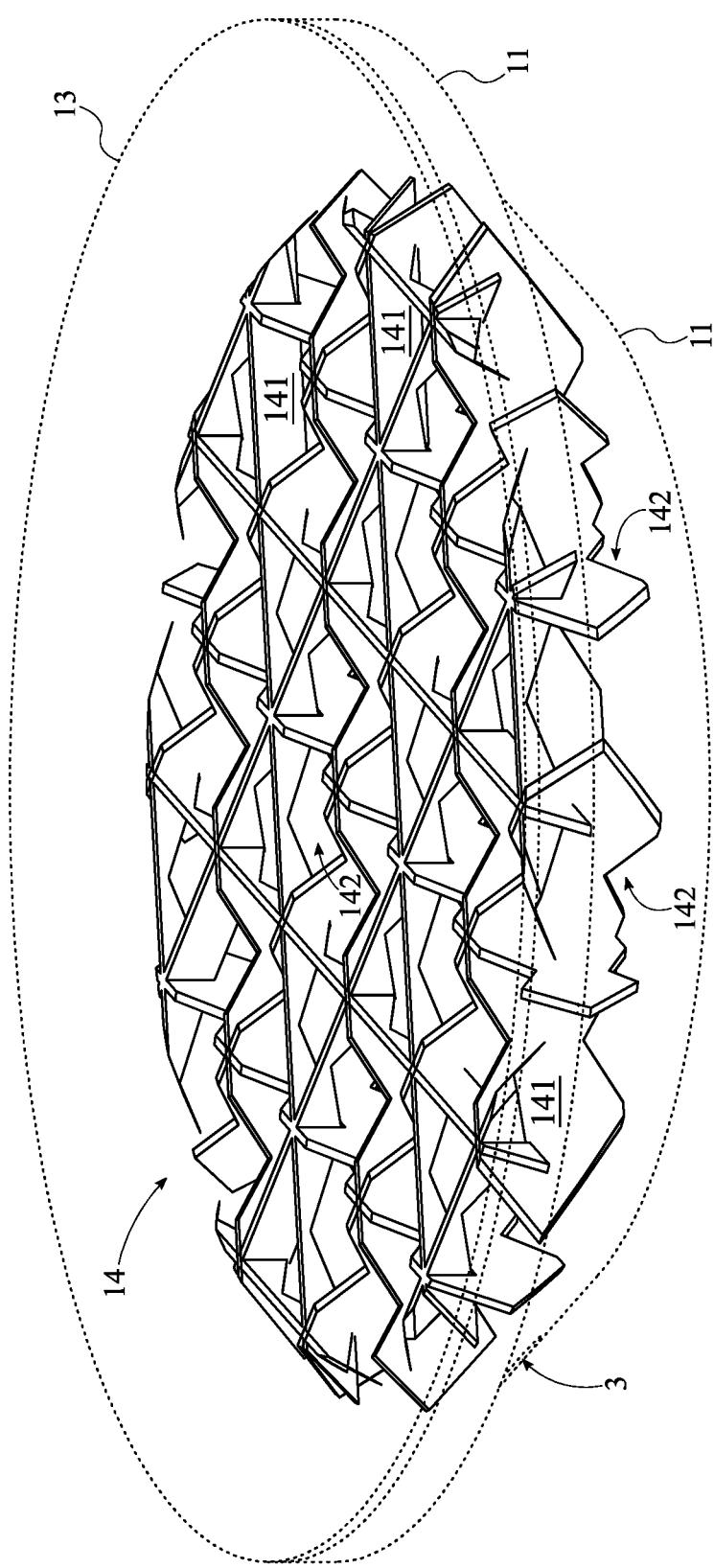
FIG. 2 is a perspective view of the internal componentry for an exemplary embodiment of the present invention.
Figure 3:
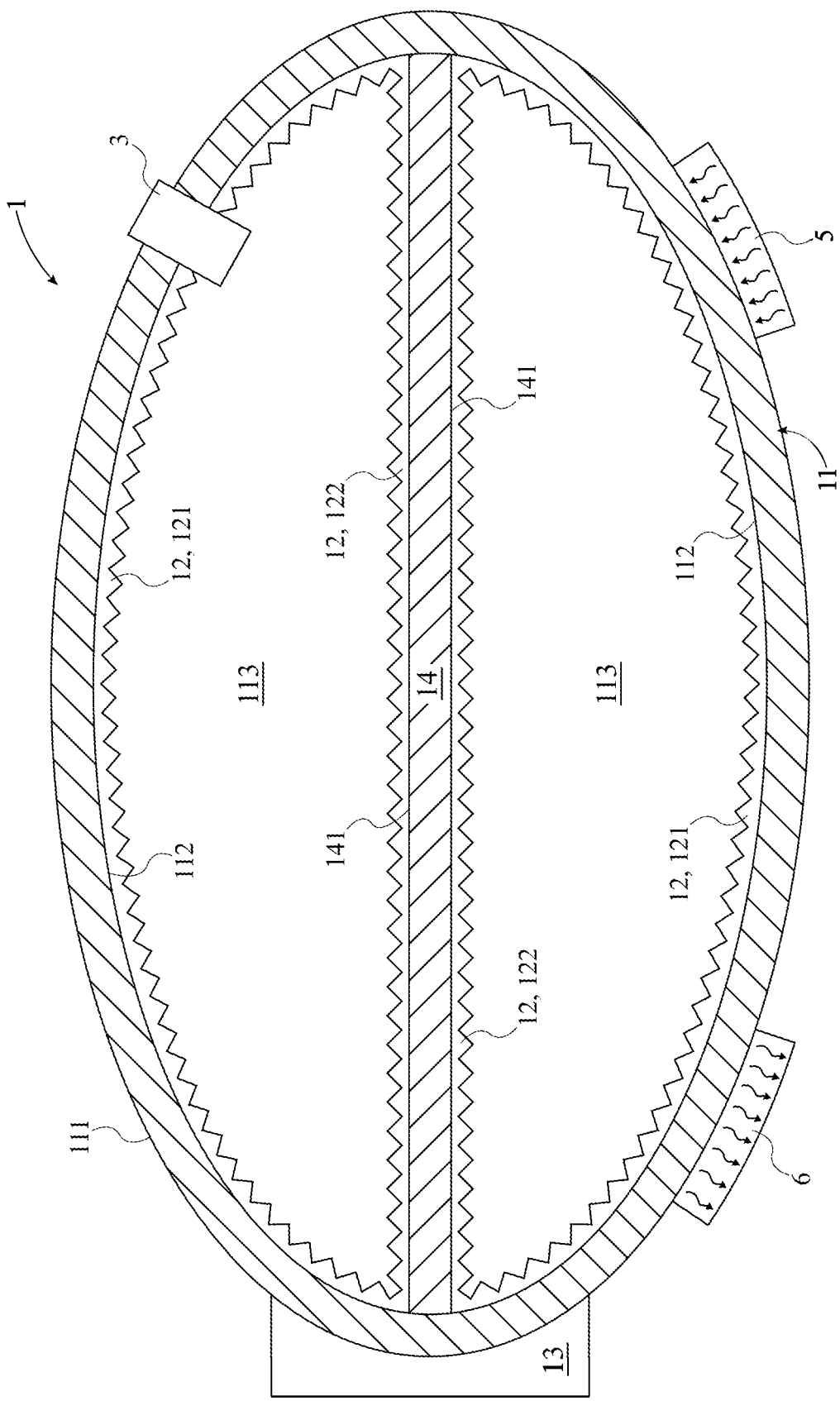
FIG. 3 is a schematic diagram of the present invention with the capillary medium as spikes.
Figure 4:
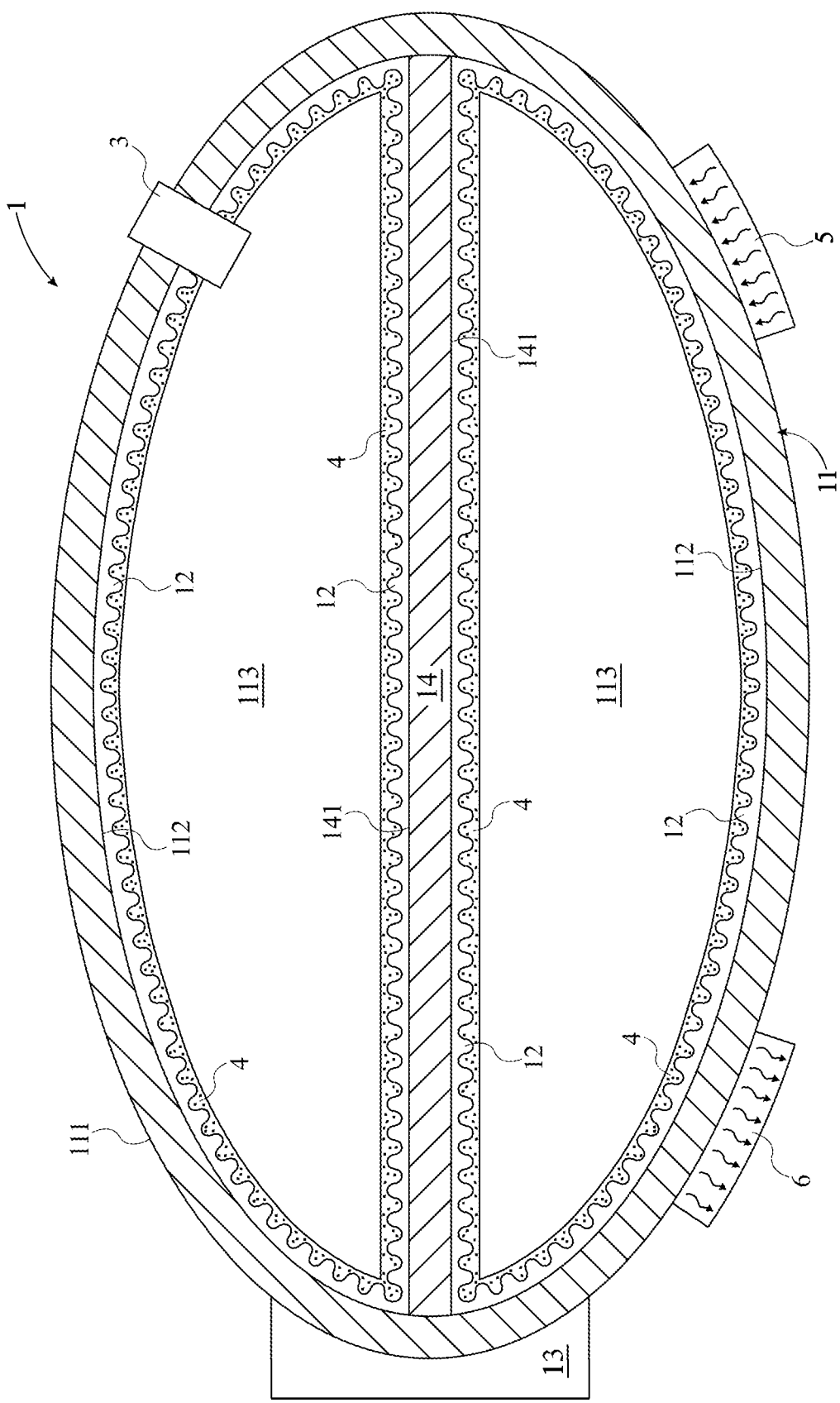
FIG. 4 is a schematic diagram of the present invention with a coating of wetting-compound applied onto the capillary medium.

As can be seen in FIGS. 2 through 4, the present invention may further comprise at least one fluid port 3, which can be used to selectively open the vacuum enclosure 11, can allow for a fluid to enter or exit the vacuum enclosure 11, and then can be used to selectively seal the vacuum enclosure 11. Thus, the at least one fluid port 3 needs to traverse through the vacuum enclosure 11 and is in fluid communication with interior volume 113, which provides access to the interior volume 113. The at least one fluid port 3 could be used initially add the quantity of thermally-convective fluid 2 into the vacuum enclosure 11 during the manufacturing process of the present invention and could then be permanently sealed off. The at least one fluid port 3 could be alternatively used to adjust the quantity of thermally-convective fluid 2 into and out of the vacuum enclosure 11 as regular maintenance of the present invention.

The plurality of cross supports 14 may be arranged in a variety of configurations, each of which is better suited to a particular implementation of the present invention. The plurality of cross supports 14 can be arranged into a regular grid shape through the interior volume 113, which configures the plurality of cross supports 14 in a repetitive manner. The plurality of cross supports 14 can alternatively be arranged into an irregular grid shape through the interior volume 113, which configures the plurality of cross supports 14 in a random manner. In addition, each configuration of the plurality of cross supports 14 provides the at least one mirror unit 1 with mechanical stability (i.e. a high first-mode frequency and a low gravity-sag) while still allowing the quantity of thermally-convective fluid 2 in its gas phase to flow through the internal volume 113.

The capillary medium 12 may also be a variety of configurations, each of which is better suited to a particular implementation of the present invention. One configuration of the capillary medium 12 is a plurality of first spikes 121 and a plurality of second spikes 122, which are shown in FIG. 3. The plurality of first spikes 121 is mounted across the interior surface 112 and is oriented away from the interior surface 112. Likewise, the plurality of second spikes 122 is mounted across the lateral surface 141 for each of the plurality of cross supports 14 and is oriented away from the lateral surface 141 for each of the plurality of cross supports 14. Another configuration of the capillary medium 12 is a course texture of the interior surface 112 and a course texture of the lateral surface 141 for each of the plurality of cross supports 14. Another configuration of the capillary medium 12 is a porous texture of the interior surface 112 and a porous texture of the lateral surface 141 for each of the plurality of cross supports 14. Another configuration of the capillary medium 12 is a sintered texture of the interior surface 112 and a sintered texture of the lateral surface 141 for each of the plurality of cross supports 14. Moreover, a sintered texture is a textured surface made from a sintered material.

As can be seen in FIG. 4, the present invention may further comprise a coating of wetting-compound 4, which is used to enhance the wicking of the quantity of thermally-convective fluid 2 in its liquid form through the capillary medium 12. Thus, the coating of wetting-compound 4 is applied across the capillary medium 12 so that the benefit of the coating of wetting-compound 4 is implemented throughout the entire interior volume 113.

As can be seen in FIGS. 3 and 4, the present invention may further comprise a heater 5 and/or a heat sink 6, which allow the present invention to externally control and maintain an ideal temperature for the at least one mirror unit 1. The heater 5 is used to raise the current temperature of the at least one mirror unit 1 to the ideal temperature. For example, the heater 5 can be used to keep the at least one mirror unit 1 warn in the presence of heat losses in a spacecraft. The heater 5 is mounted external to vacuum enclosure 11 so that the heater 5 does not interfere with the heat-pipe cycle occurring within the interior volume 113. However, the heater 5 is in thermal communication with the interior volume 113, which allows the heater 5 to readily raise the current temperature of the at least one mirror unit 1. In some embodiments of ground or airborne mirror structures (i.e. mirror structures used in gravity, the heater 5 is positioned at the elevationally lowest part on the at least one mirror unit 1 in order to prevent the quantity of thermally-convective fluid 2 from pooling at the elevationally lowest part. Similarly, the heat sink 6 is used to lower the current temperature of the at least one mirror unit 1 to the ideal temperature. The heat sink 6 can be, but is not limited to, chillers, coolers, and cryocoolers. For example, the heat sink 6 can be used to maintain the temperature of cryogenic mirror detecting infrared radiation. The heat sink 6 is also mounted external to vacuum enclosure 11 so that the heat sink 6 does not interfere with the heat-pipe cycle occurring within the interior volume 113. However, the heat sink 6 is also in thermal communication with the interior volume 113, which allows the heat sink 6 to readily lower the current temperature of the at least one mirror unit 1. Some of options for heating and/or cooling for the present invention include, but are not limited to: a combination heating-and-cooling device (e.g. a Peltier cooler); and an ancillary structure (e.g. a cold finger).

Figure 5:
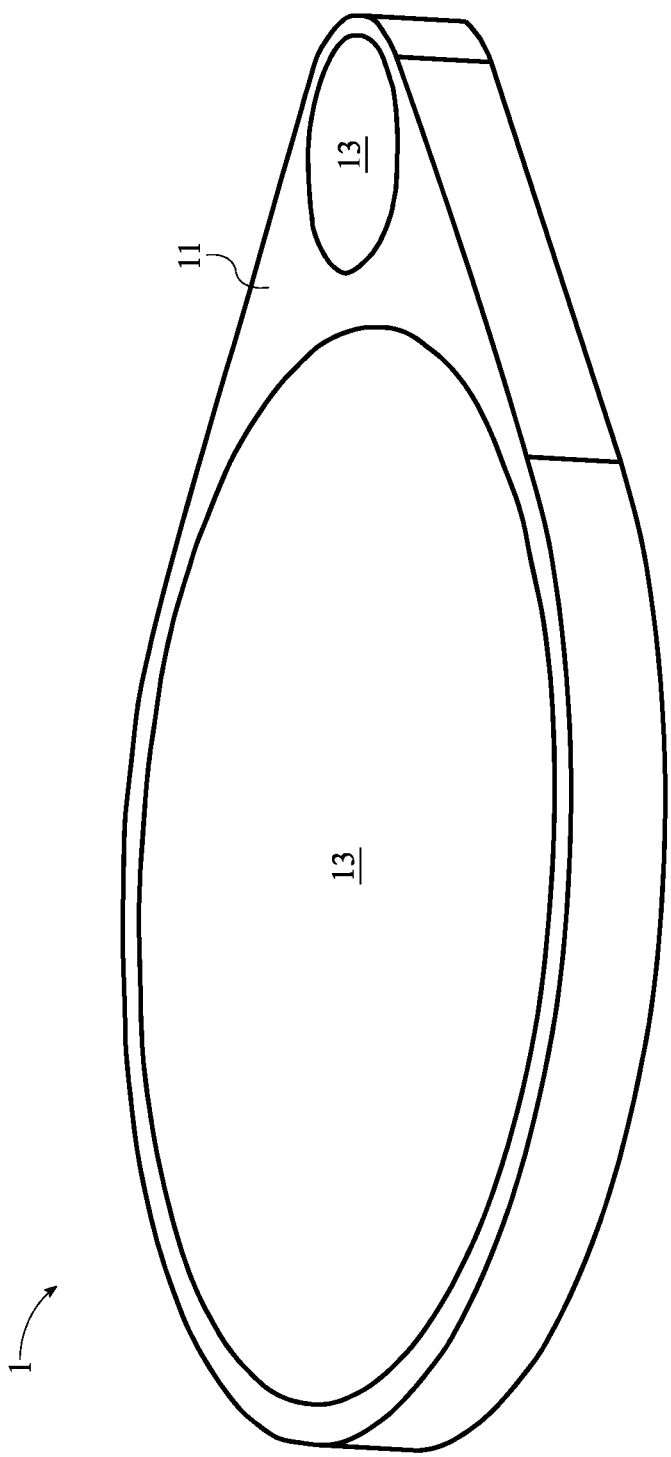
FIG. 5 is a perspective view of an embodiment of the present invention with two offset reflectors.

In some embodiments of the present invention, the at least one reflector 13 is a plurality of reflectors in order to reflect separate focuses of EM radiation off the at least one mirror unit 1. As can be seen FIG. 5, the plurality of reflectors is positioned offset from each other across the exterior surface 111, which allows the at least one mirror unit 1 to accommodate the separate focuses of the EM radiation about the exterior surface 111. Moreover, this arrangement is used to maintain precision in the optical spacing between the plurality of reflectors.

Figure 6:
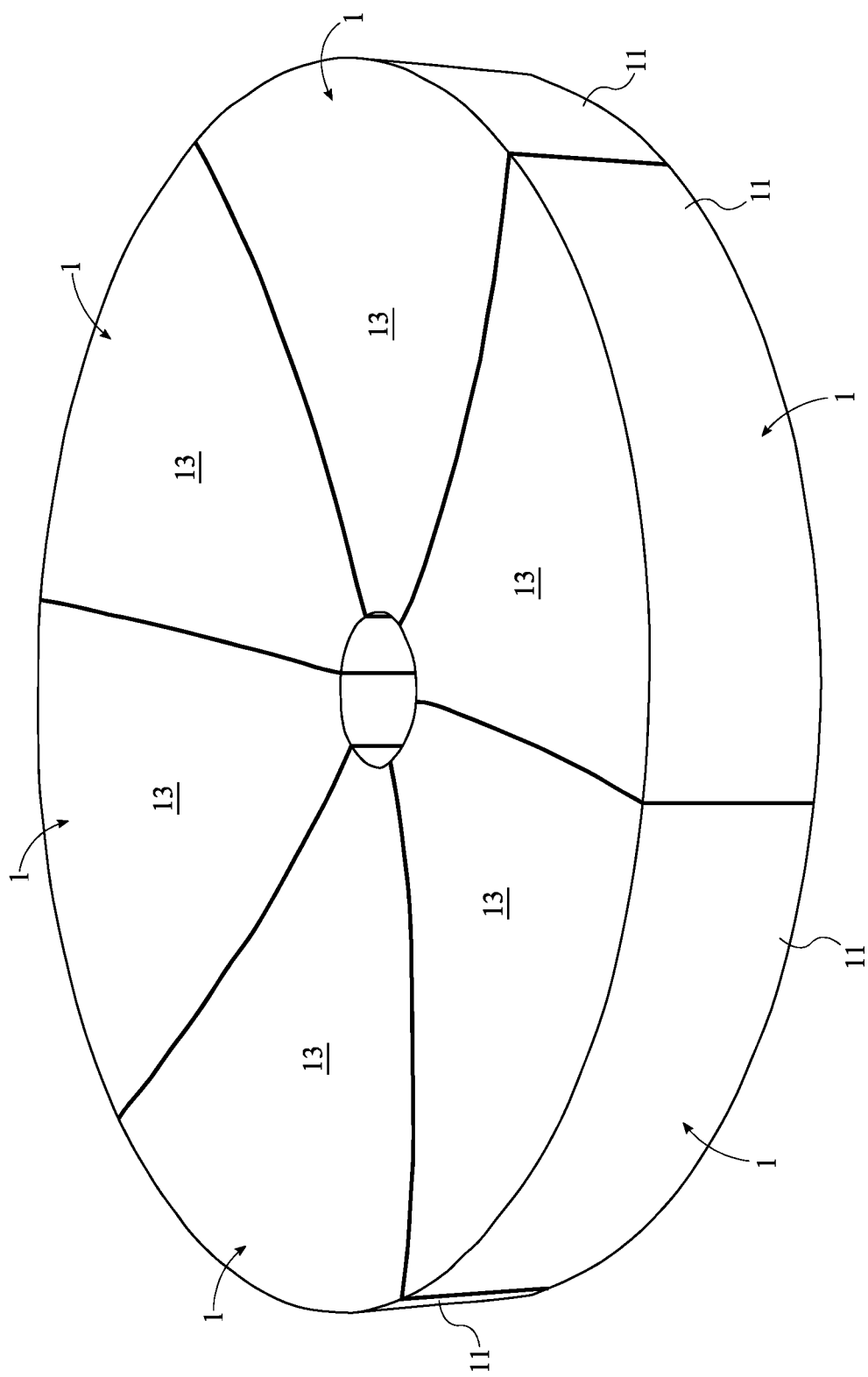
FIG. 6 is a perspective view of an embodiment of the present invention with a plurality of mirror units.
Figure 7:
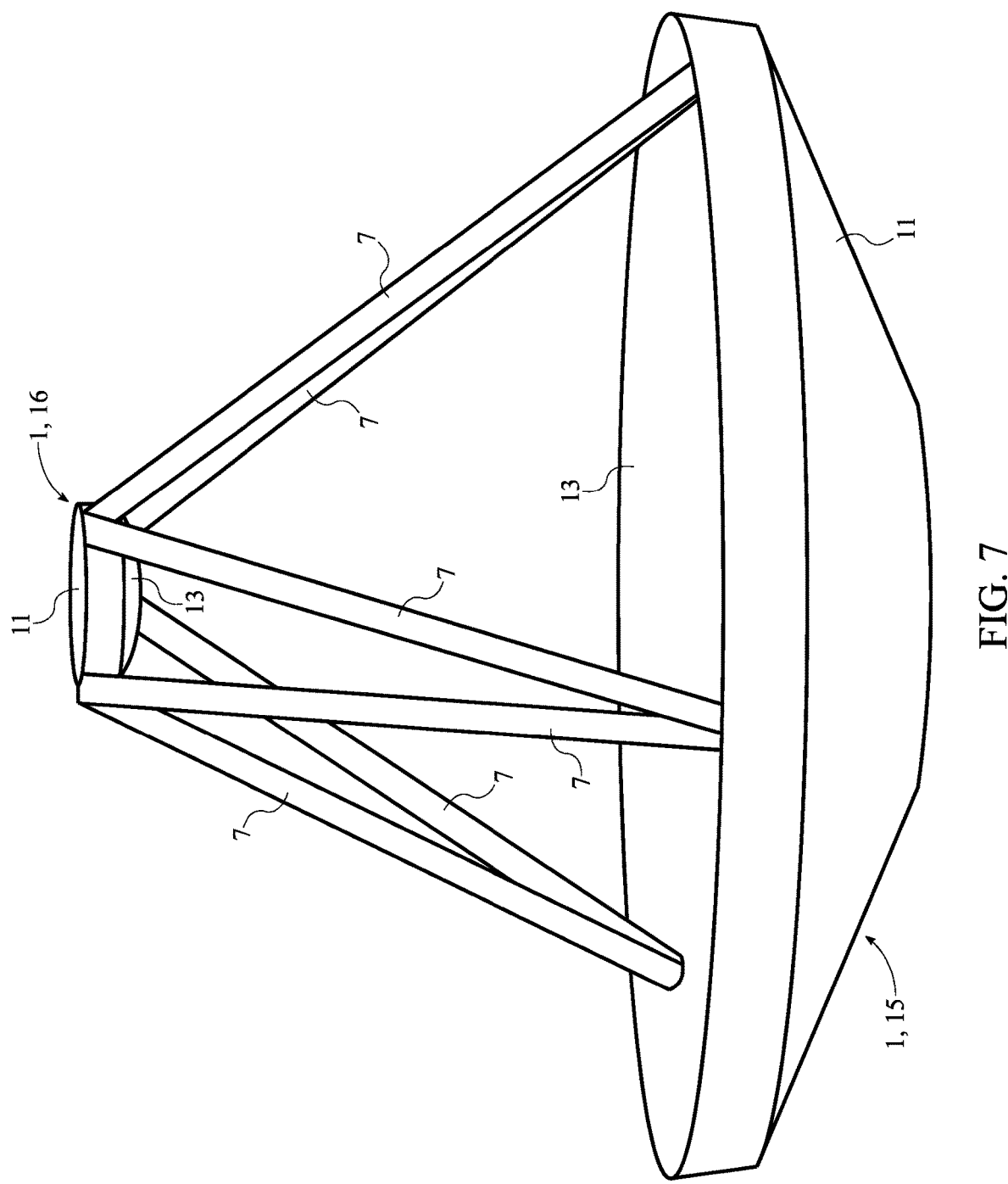
FIG. 7 is a perspective view of an embodiment of the present invention with a metering structure.

The at least one mirror unit 1 may also be arranged in a variety of configurations, each of which is better suited to a particular implementation of the present invention. As can be seen FIG. 6, one configuration of the at least one mirror unit 1 is a plurality of mirror units, which are radially mounted to each other. This configuration allows for the at least one reflector 13 of each of the plurality of mirror units to be arranged in a manner that increases the combined reflective surface provided by the present invention and in a manner that minimizes the space occupied by the componentry that is separately fabricated and joined to form the present invention. This configuration also allows the heat pipe for each mirror unit to work independently from each other. As can be seen in FIG. 7, another configuration of the at least one mirror unit 1 is a primary unit 15 and a secondary unit 16, wherein the primary unit 15 is a larger spanning mirror unit than the secondary unit 16. This configuration of the at least one mirror unit 1 also comprises a metering structure 7, which is also used to maintain precision in the optically spacing between the primary unit 15 and the secondary unit 16. Consequently, the primary unit 15 and the secondary unit 16 are mounted offset from each other by the metering structure 7. In addition, the interior volume 113 of the primary unit 15 and the interior volume 113 of the secondary unit 16 are in fluid communication with each other through the metering structure 7 so that the heat-pipe cycle occurs within a single shared interior volume between the primary unit 15 and the secondary unit 16.

The vacuum enclosure 1 may be made of different kinds of materials, each of which is better suited to a particular implementation of the present invention. One embodiment of the vacuum enclosure 1 is made of a porous material [e.g. titanium or titanium with 6% aluminum and 4% vanadium (Ti64)], which would need to be sealed in order to prevent the quantity of thermally-convective fluid 2 from leaking out of the vacuum enclosure 1. Thus, the vacuum enclosure 1 in this embodiment is preferably coated to seal the porosity (e.g. nickel plating). In addition, some other embodiments of the vacuum enclosure 1 use a three-dimensionally printable material (e.g. Titanium, Ti64, Invar, aluminum, etc.) or a glass or glass/ceramic material, which are materials that can be configured to thermally stabilize better with the present invention. Consequently, the present invention is able to thermally stabilize materials with higher rigidity with a lower weight and a lower capacity to thermally stabilize (e.g. titanium, silicon carbide, and beryllium). Moreover, the external surface 111 is preferably plated or coated with a material that can be efficiently processed into an optical surface or the at least one reflector 13. Examples of this material include, but are not limited to, electroless nickel plating that allows for diamond turning of the optical surface, sputtered glass that allows for conventional polishing and diamond turning, and replicated-metal or nanolaminate surfaces.

Although the invention has been explained in relation to its preferred embodiment, it is to be understood that many other possible modifications and variations can be made without departing from the spirit and scope of the invention as hereinafter claimed.

What is claimed is:

1. An isothermalized mirror assembly comprises:
at least one mirror unit;
a quantity of thermally-convective fluid;
each of the at least one mirror unit comprises a vacuum enclosure, a capillary medium, at least one reflector, and a plurality of cross supports;
the vacuum enclosure comprises an exterior surface and an interior surface;
each of the plurality of cross supports comprises a lateral surface;
an interior volume being delineated by the interior surface;
the plurality of cross supports being mounted within the vacuum enclosure;
the plurality of cross supports being distributed throughout the interior volume;
the capillary medium being mounted across the interior surface and the lateral surface for each of the plurality of cross supports;
the quantity of thermally-convective fluid being retained within the interior volume; and
the at least one reflector being mounted onto the exterior surface.

2. The isothermalized mirror assembly, as claimed in claim 1, comprises:
the interior volume being configured as a heat pipe, wherein the quantity of thermally-convective fluid converts between a gas phase and a liquid phase as the quantity of thermally-convective fluid travels through the capillary medium.

3. The isothermalized mirror assembly, as claimed in claim 1, comprises:
at least one fluid port;
the at least one fluid port traversing into the vacuum enclosure; and
the at least one fluid port being in fluid communication with the interior volume.

4. The isothermalized mirror assembly, as claimed in claim 1, comprises:
the plurality of cross supports being arranged into a regular grid shape through the interior volume.

5. The isothermalized mirror assembly, as claimed in claim 1, comprises:
the plurality of cross supports being arranged into an irregular grid shape through the interior volume.

6. The isothermalized mirror assembly, as claimed in claim 1, comprises:
the capillary medium being a plurality of first spikes and a plurality of second spikes;
the plurality of first spikes being mounted across the interior surface;
the plurality of first spikes being oriented away from the interior surface;
the plurality of second spikes being mounted across the lateral surface for each of the plurality of cross supports; and
the plurality of second spikes being oriented away from the lateral surface for each of the plurality of cross supports.

7. The isothermalized mirror assembly, as claimed in claim 1, comprises:
the capillary medium being a course texture of the interior surface and a course texture of the lateral surface for each of the plurality of cross supports.

8. The isothermalized mirror assembly, as claimed in claim 1, comprises:
the capillary medium being a porous texture of the interior surface and a porous texture of the lateral surface for each of the plurality of cross supports.

9. The isothermalized mirror assembly, as claimed in claim 1, comprises:
    the capillary medium being a sintered texture of the interior surface and a sintered texture of the lateral surface for each of the plurality of cross supports.

10. The isothermalized mirror assembly, as claimed in claim 1, comprises:
    a coating of wetting-compound; and
    the coating of wetting-compound being applied across the capillary medium.

11. The isothermalized mirror assembly, as claimed in claim 1, comprises:
    a heater;
    the heater being mounted external to the vacuum enclosure; and
    the heater being in thermal communication with the interior volume.

12. The isothermalized mirror assembly, as claimed in claim 1, comprises:
    a heat sink;
    the heat sink being mounted external to the vacuum enclosure; and
    the heat sink being in thermal communication with the interior volume.

13. The isothermalized mirror assembly, as claimed in claim 1, comprises:
    at least one reflector being a plurality of reflectors; and
    the plurality of reflectors being positioned offset from each other across the exterior surface.

14. The isothermalized mirror assembly, as claimed in claim 1, comprises:
    the at least one mirror unit being a plurality of mirror units; and
    the plurality of mirror units being radially mounted to each other.

15. The isothermalized mirror assembly, as claimed in claim 1, comprises:
    a metering structure;
    the at least one mirror unit comprises a primary unit and a secondary unit;
    the primary unit and the secondary unit being mounted offset from each other by the metering structure; and
    the interior volume of the primary unit and the interior volume of the secondary unit being in fluid communication with each other through the metering structure.

* * * * *